(No Model.)
T. DE CODEZO.
COMBINED EYE REST AND SCREEN FOR PHOTOGRAPHERS.
No. 270,401. Patented Jan. 9, 1883.
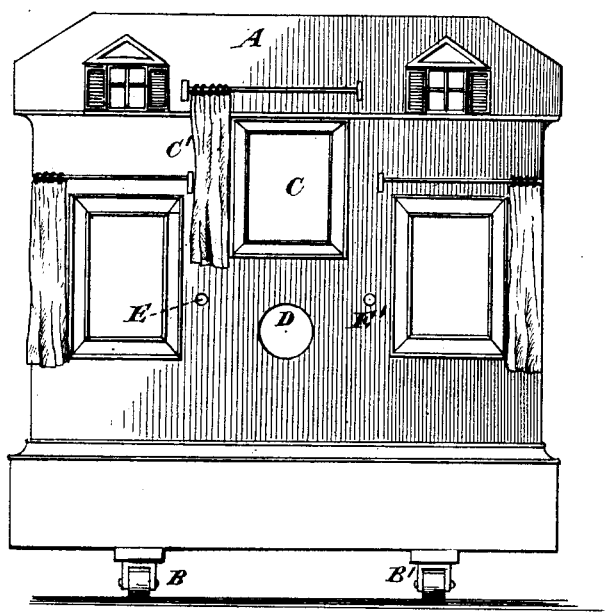
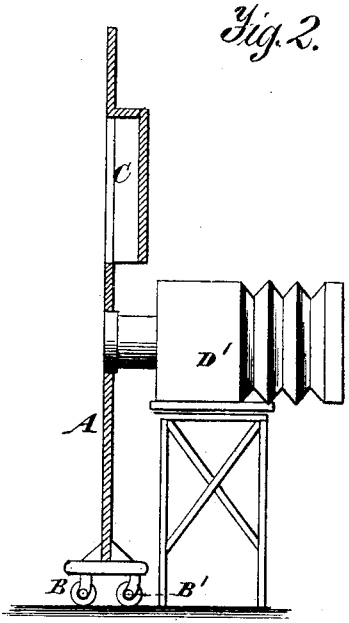
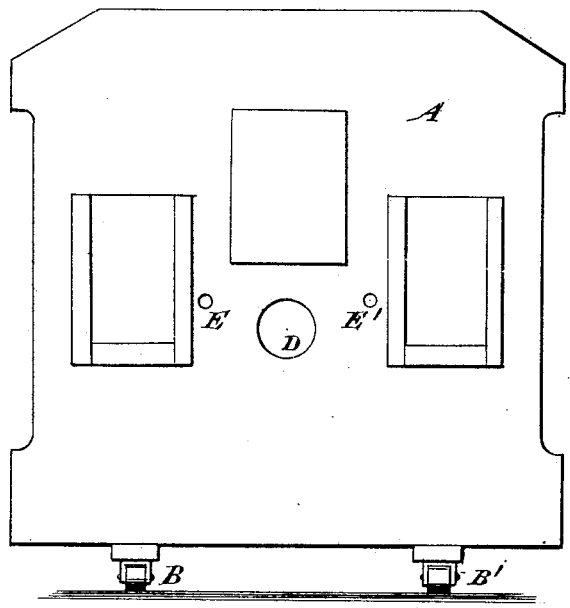

UNITED STATES PATENT OFFICE.

THOMAS DE CODEZO, OF NEW YORK, N. Y.

COMBINED EYE-REST AND SCREEN FOR PHOTOGRAPHERS.

SPECIFICATION forming part of Letters Patent No. 270,401, dated January 9, 1883.

Application filed September 7, 1882. (No model.)

*To all whom it may concern:*

Be it known that I, THOMAS DE CODEZO, a citizen of the United States, residing at New York, in the county of New York and State of York, have invented a certain new and useful Improvement in Combined Eye-Rest and Screen for Photographers, of which the following is a specification, reference being had therein to the accompanying drawings.

My invention relates to screens to be used in photograph-galleries, especially in taking pictures of children; and the object of my improvement is to provide a screen to be placed between the operator, so constructed as to conceal him and the camera from the person sitting for a picture. I attain this object by the device illustrated in the accompanying drawings, in which—

Figure I is a front elevation of a screen of my improved form, showing a central aperture through which to exhibit automatic toys or pictures, protected by a curtain, and two other receptacles for the exhibition of toys or pictures and other ornamentations, one aperture against which to place the tube of the camera, two small apertures through which to observe the condition and position of the person whose picture is being taken, and feet supplied with rollers for facilitating the placing of the screen. Fig. II is a side elevation, partly in section, showing the screen and the camera in position behind it; and Fig. III is a rear side view.

Similar letters refer to similar parts throughout the several views.

It is well known to persons accustomed to taking photographs of children that they frequently become so much frightened upon seeing the tube of the camera pointed directly at them that it is difficult and sometimes impossible to keep them in such a position and condition that a good picture can be taken.

My invention is designed to remedy this difficulty by providing a screen which can be placed between the child and the operator and camera, the surface presented to the child being so ornamented and supplied with toys or pictures as to attract and please the child and prevent it from observing what the operator is doing. For this purpose there is provided a screen, A, of any desired dimensions, it being supplied with suitable feet and rollers, B B', as shown best in Fig. II, for supporting it and for facilitating its movements in placing it in position, said screen being made of sheet metal, wood, or of any other suitable substance, and provided with an aperture, C, in its upper portion, which may be covered with a box or otherwise inclosed, in which to place automatically-moving toys or pictures for the purpose of attracting the attention of the child and diverting it from the camera and the operator. This apparatus I prefer to cover on the front side with a curtain, C', which can be readily removed and replaced by cords arranged for that purpose in the usual or any approved manner. Below and at the sides of the aperture above named I prefer to place toys or pictures, to be covered with curtains, as above described. The face of the screen may have upon it other ornamentations of any kind that will attract the attention of the child, and to any one of which it may be directed when its picture is being taken.

For the purpose of enabling the operator to properly place his camera and adjust its focus without being seen by the child, an aperture, D, is formed at a suitable point in the screen, its diameter being sufficiently large to receive the end of the tube of the camera D', such an arrangement being shown in Fig. II. In the taking of pictures of the kind herein referred to it is important that the operator should be able when adjusting his camera to observe the position and condition of the person sitting for the picture, in order that he may know just when to remove the cover; and to enable this to be done there is formed in the screen two or more small apertures, E E', through which the operator can observe his sitters without being seen by them.

Having thus described my improved screen, what I claim, and desire to secure by Letters Patent, is—

1. A screen for use in taking photographic and other similar pictures, having upon its face ornamentations and in it a recess or recesses for the exhibition of toys or pictures, an aperture for the reception of the tube of the camera, and apertures for enabling the operator to observe the condition and position of the sitters without being seen by them, the construction being substantially as described.

2. The combination of the screen A, mounted on rollers and formed with recesses and perforations, as described, said recesses adapted to be covered by curtains strung on rods secured above the recesses, as shown, with a camera mounted on a stand and having a tube adapted to pass into said perforation in the screen, substantially as shown and specified.

In testimony whereof I affix my signature in presence of two witnesses.

THOS. DE CODEZO.

Witnesses:
BERNARD J. KELLY,
SPENCER C. DOTY.